United States Patent
Hanawa

(10) Patent No.: US 7,878,604 B2
(45) Date of Patent: Feb. 1, 2011

(54) DAMPING FORCE GENERATING MECHANISM

(75) Inventor: Nobumichi Hanawa, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 173 days.

(21) Appl. No.: 12/076,057

(22) Filed: Mar. 13, 2008

(65) Prior Publication Data

US 2008/0223674 A1 Sep. 18, 2008

(30) Foreign Application Priority Data

Mar. 14, 2007 (JP) ............................. 2007-064792

(51) Int. Cl.
*F16F 9/50* (2006.01)

(52) U.S. Cl. ................. 303/119.1; 188/290; 280/5.512; 280/272

(58) Field of Classification Search ... 188/266.1–266.5, 188/282.2, 310–313, 322.13; 303/119.1; 280/90, 270, 272
See application file for complete search history.

(56) References Cited

U.S. PATENT DOCUMENTS

| 5,662,046 | A | * | 9/1997 | Wright et al. | ................ | 105/167 |
| 7,448,479 | B2 | * | 11/2008 | Fukuda et al. | ........... | 188/322.2 |
| 2003/0132073 | A1 | * | 7/2003 | Nakadate | ................ | 188/282.2 |
| 2006/0113834 | A1 | * | 6/2006 | Hanawa | ................ | 303/119.1 |
| 2006/0175166 | A1 | * | 8/2006 | Fischer | ................ | 188/322.13 |
| 2006/0231359 | A1 | * | 10/2006 | Matsunaga et al. | ......... | 188/313 |

FOREIGN PATENT DOCUMENTS

JP 2006-183864 7/2006

* cited by examiner

*Primary Examiner*—Christopher P Schwartz
(74) *Attorney, Agent, or Firm*—Rabin & Berdo, P.C.

(57) ABSTRACT

A damping force generating mechanism (V) comprises a front valve body (6) which allows working oil to flow from a first oil chamber (R1) to a second oil chamber (R2) under a predetermined resistance when lifted, and a rear valve body (7) which is disposed on the rear side of the front valve body (6) and allows working oil to flow from the second oil chamber (R1) to the first oil chamber (R1) under a predetermined resistance when lifted. An oil passage (5c) and a check valve (10) are provided to serve as a part of a flow path from the second oil chamber (R2) to the first oil chamber (R1). By disposing the oil passage (5d) in parallel with a center axis of the front valve body (6) and the rear valve body (7), the size of the damping force generating mechanism (V) can be reduced.

9 Claims, 3 Drawing Sheets

DAMPING FORCE GENERATING MECHANISM

FIELD OF THE INVENTION

This invention relates to a hydraulic pressure type damping force generating mechanism, and more specifically to a damping force generating mechanism applied to a steering damper of a motorcycle.

BACKGROUND OF THE INVENTION

JP2006-183864A published by the Japan Patent Office in 2006 discloses a steering damper interposed between handlebars and a vehicle body of a motorcycle to suppress unintended yaw or yaw oscillation of the front wheel while the motorcycle is running. This steering damper comprises a double-rod type damper cylinder and a damping force generating mechanism generating a damping force against the elongation/contraction of the damper cylinder, in a common housing.

The damper cylinder comprises a cylinder barrel and a piston enclosed in the cylinder barrel. Two piston rods are fixed to either end face of the piston and project outwardly in an axial direction from the cylinder barrel. A first oil chamber and a second oil chamber having an identical cross-sectional area are formed by the piston in the cylinder barrel.

The damping force generating mechanism comprises two valve bodies, i.e., a front valve body and a rear valve body, disposed coaxially in the housing. The two valve bodies are seated on two valve seats respectively. The rear valve body is biased by a solenoid actuator towards a closed position. The rear valve body is in contact with the front valve body so as to bias the front valve body towards a closed position.

Hydraulic pressure led from the first oil chamber in the damper cylinder is exerted on the front valve body towards an open position. Hydraulic pressure in the second oil chamber of the damper cylinder is led to a pressure chamber formed between the two valve bodies.

When the hydraulic pressure in the first oil chamber rises in accordance with displacement of the piston in a direction to compress the first oil chamber in the cylinder barrel, both the front valve body and the rear valve body retreat from the respective valve seats, and the working oil flows out from the first oil chamber, passes along an outer circumferential surface of the front valve body, and flows into the second oil chamber via the pressure chamber between the two valve bodies.

When, on the other hand, the hydraulic pressure in the second oil chamber rises in accordance with a displacement of the piston in a direction to compress the second oil chamber in the cylinder barrel, the pressure in the pressure chamber between the two valve bodies rises such that only the rear valve body retreats from the corresponding valve seat. As a result, the working oil flows out from the pressure chamber between the two valve bodies, passes along an outer circumferential surface of the rear valve body, and flows into a pressure chamber formed on the rear side of the rear valve body. This pressure chamber is connected to the first oil chamber via a check valve, and hence the working oil in this pressure chamber flows into the first oil chamber via the check valve.

The flow cross-sectional area of each of the two valve bodies when lifted varies according to the lift amount. By appropriately setting this relationship, the damping force generating mechanism can generate a preferable damping force in relation to the lift amount of the valve bodies.

The displacement of the piston in the cylinder barrel is damped by the damping force generated in this way.

This steering damper operates in a state where a cylinder barrel of the damper cylinder is engaged with one of a vehicle body and handlebars of a motorcycle while one of the piston rods is engaged with the other of the vehicle body and the handlebars of the motorcycle. The damping force generated according to the displacement of the piston in the cylinder barrel suppresses unintended yaw or yaw oscillation of the front wheel such that the riding comfort of the motorcycle is maintained.

SUMMARY OF THE INVENTION

Since the steering damper is disposed in a limited space between the front wheel and the vehicle body of a motorcycle, it is preferably made compact in size. In the prior art steering damper, a passage in which the check valve is installed is disposed perpendicular to the direction of displacement of the valve bodies in the damping force generating mechanism, and hence it is difficult to reduce the size of the housing that encloses the damping force generating mechanism.

It is therefore an object of this invention to reduce the size of a damping force generating mechanism.

In order to achieve the above object, this invention provides a damping force generating mechanism which generates a damping force accompanying a flow of working oil between a first oil chamber and a second oil chamber, comprising a front valve body which allows working oil to flow from the first oil chamber to the second oil chamber under a predetermined resistance when lifted in an axial direction, a rear valve body which is disposed on the rear side of the front valve body coaxially therewith and allows working oil to flow from the second oil chamber to the first oil chamber under a predetermined resistance when lifted in the axial direction, an oil passage disposed in parallel with a center axis of the front valve body and the rear valve body as a part of a flow path from the second oil chamber to the first oil chamber, and a check valve which allows working oil to flow from the oil passage into the first oil chamber while preventing working oil from flowing in a reverse direction.

The details as well as other features and advantages of this invention are set forth in the remainder of the specification and are shown in the accompanying drawings.

DESCRIPTION OF THE PREFERRED EMBODIMENTS

Figure 1:
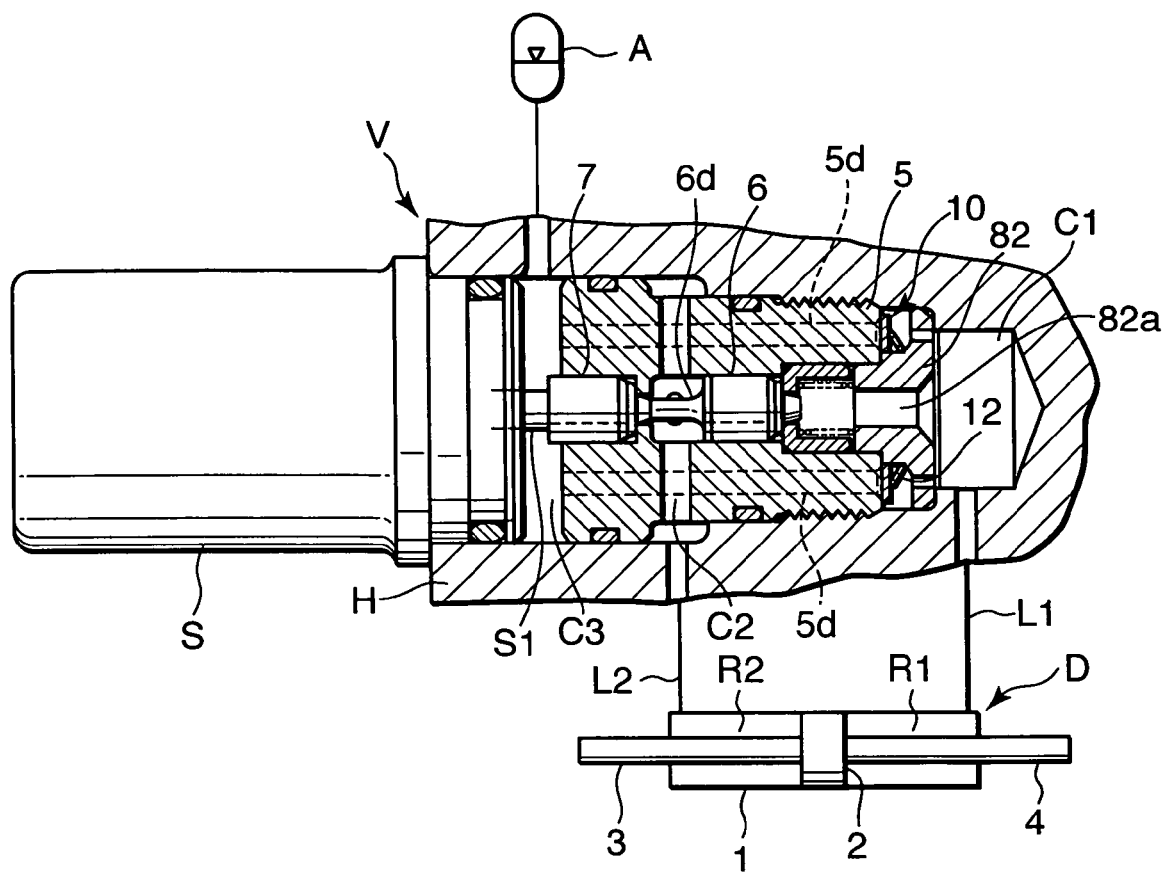
FIG. 1 is a schematic diagram of a steering damper, including a longitudinal sectional view of a damping valve according to this invention.

Referring to FIG. 1 of the drawings, a steering damper for a motorcycle comprises a damper cylinder D, a damping valve V which serves as a damping force generating mechanism, and an accumulator A. The damper cylinder D and the damping valve V are connected to each other by a passage L1 and a passage L2.

The figure shows the construction of the damping valve V in detail, but shows the construction of the cylinder D, which is not a part of this invention, schematically. Although the damping valve V appears to be isolated from the cylinder D, the cylinder D and the damping valve V are enclosed in a common housing H together with the accumulator A.

The cylinder D is a well known double-rod type cylinder. The cylinder D comprises a cylinder barrel 1, a piston 2 accommodated in the cylinder barrel 1 so as to be free to slide, and a pair of piston rods 3, 4 which are fixed to either end face of the piston 2 and project outwardly from the cylinder barrel 1 in an axial direction. The cylinder barrel 1 is connected to handlebars of a motorcycle while connecting one of the piston rods 3 or 4 to a vehicle body of the same.

A first oil chamber R1 and a second oil chamber R2 are formed in the cylinder barrel 1 by the piston 2. In the double-rod type cylinder D, a varied amount of oil in the first oil chamber R1 and a varied amount of oil in the second oil chamber R2 when the piston 2 displaces are inherently identical.

In addition to the damping valve V, it is possible to further provide another damping valve which allows working oil to flow between the oil chambers R1 and R2 in the piston 2.

The damping valve V comprises a valve case 5 screwed into the housing H. A slide hole having a circular cross-section is formed in the center of the valve case 5. A front valve body 6 and a rear valve body 7 are fitted into the slide hole coaxially in series.

Figure 2:
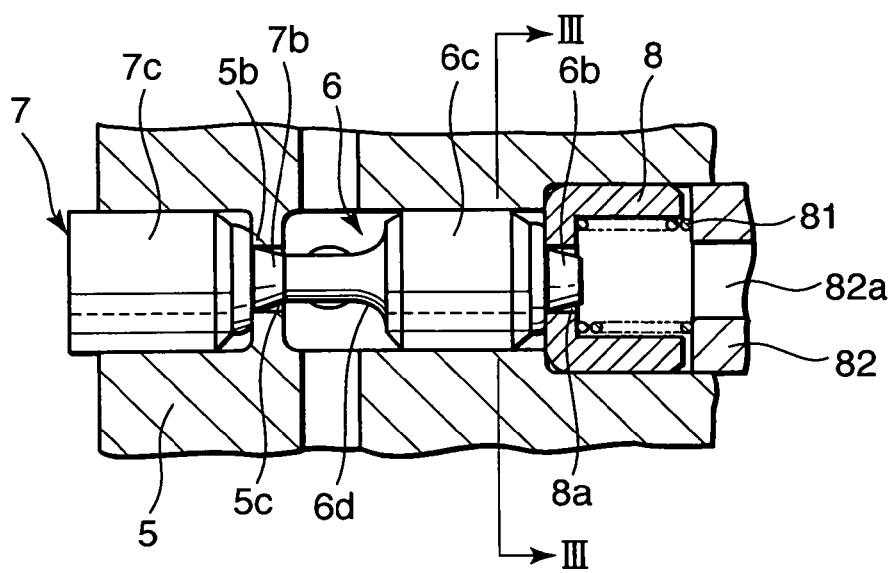
FIG. 2 is an enlarged side view of a front valve body and a rear valve body disposed in the damping valve.

Referring to FIG. 2, the front valve body 6 is seated on a retractable valve seat 8 which is accommodated in the valve case 5. The retractable valve seat 8 is supported by a coil spring 81 in a direction to face the front valve body 6. The coil spring 81 is supported by a stopper 82 gripped between the valve case 5 and the housing H. The retractable valve seat 8 has a ring-shaped seat face, and the front valve body 6 comprises a conical tip 6b which penetrates a hole portion 8a surrounded by the seat face. The conical tip 6b has a function to define the flow cross-sectional area of the hole portion 8a when the front valve body 6 is lifted from the valve seat 8, or in other words retreats from the retractable valve seat 8.

The valve body 7 is seated on a ring-shaped fixed valve seat 5b which is formed as a part of the housing 5. The valve body 7 comprises a conical tip 7b which penetrates a hole portion 5c surrounded by the fixed valve seat 5b. The conical tip 7b has a function to define a flow cross-sectional area of the hole portion 5c when the valve body 7 is lifted from the valve seat 5b, or in other words retreats from the fixed valve seat 5b.

Referring again to FIG. 1, a push rod S1 is in contact with the rear face of the rear valve body 7. The push rod S1 projects from a solenoid actuator S fixed to the housing H. The solenoid actuator S biases the rear valve body 7 via the push rod S1 towards the fixed valve seat 5b, or in other words towards the closed position, according to an energizing current supplied from outside.

The front valve body 6 comprises a rod portion 6d which projects axially rearward. The rear valve body 7 when biased by the push rod S1 towards the closed position causes the conical tip 7b to contact the rod portion 6d from behind.

Of the two valve seats 8 and 5c, the retractable valve seat 8 is supported by the coil spring 81. This arrangement ensures that the front valve body 6 is supported by the rear valve body 7 via the conical tip rod 7b and the rod portion 6d becomes seated when the rear valve body 7 is seated on the valve seat 5b.

The front valve body 6 and the rear valve body 7 thus constructed are supported in the valve case 5 so as to be free to displace in an axial direction.

A pressure chamber C1 is formed in the housing H in front of the stopper 82. The pressure chamber C1 is permanently connected to the first oil chamber R1 of the cylinder D via a passage L1 formed in the housing H. The stopper 92 has a hollow part 82a and the hydraulic pressure of the pressure chamber C1 led through the hollow part 82a, is always exerted on the valve body 6.

A pressure chamber C3 is formed in the housing H facing a rear end face of the rear valve body 7. The pressure chamber C3 is permanently connected to the accumulator A.

A pressure chamber C2 is formed in the housing H so as to face the conical tip 7b of the rear valve body 7 and the rod portion 6b of the front valve body 6. The pressure chamber C2 is permanently connected to the second oil chamber R2 of the damper cylinder D via a passage L2 formed in the housing H.

Figure 3:
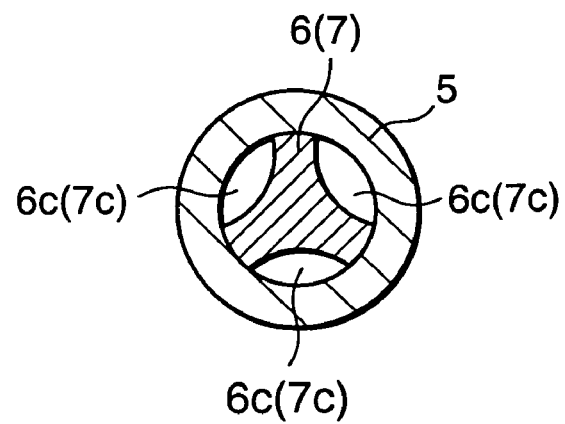
FIG. 3 is a cross-sectional view of the front valve body taken along a line III-III in FIG. 2.

Referring to FIG. 3, the front valve body 6 has three grooves 6c formed on the outer circumference thereof in the axial direction at equal angular intervals. The rear valve body 7 also has three grooves 7c formed on the outer circumference thereof in the axial direction at equal angular intervals. The grooves 6c function as a passage to cause working oil to flow from the pressure chamber C1 to the pressure chamber C2 when the front valve body 6 is lifted from the retractable valve seat 8. The grooves 7c function as a passage to cause working oil to flow from the pressure chamber C2 to the pressure chamber C3 when the rear valve body 7 is lifted from the fixed valve seat 5b Referring again to FIG. 1, a plurality of passages 5d are formed though the valve case 5 in parallel with a center axis of the valve bodies 6 and 7 as an oil passage to connect the pressure chamber C3 to the pressure chamber C1. An end of each passage 5d opens onto the pressure chamber C3. The other end of each passage 5d is closed by a check valve 10.

Figure 4:
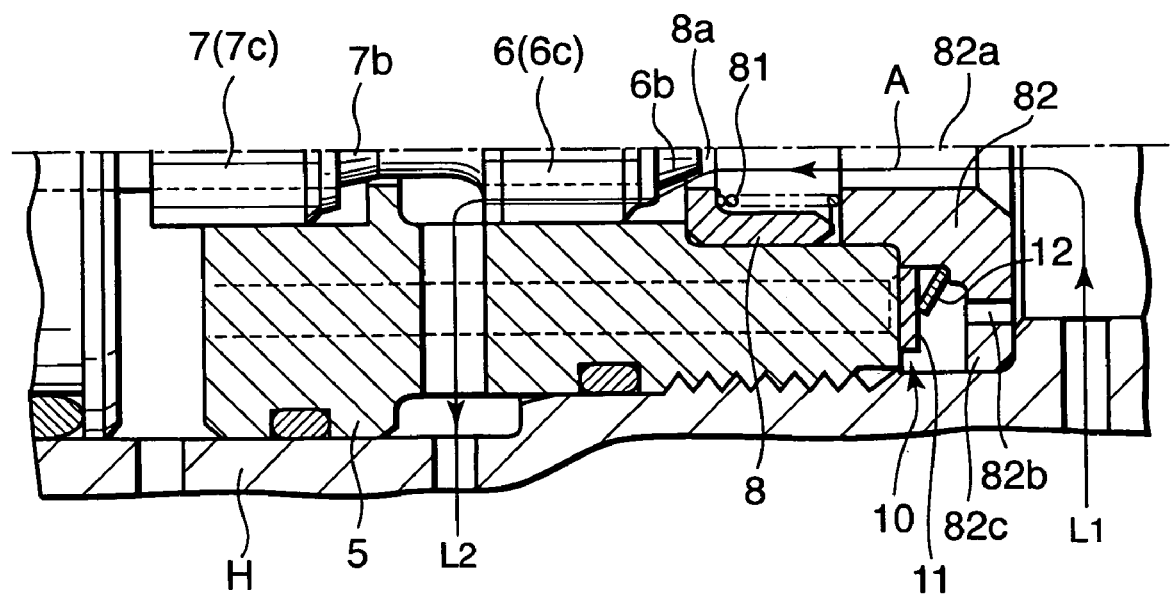
FIG. 4 is an enlarged longitudinal sectional view of essential parts of the damping valve showing a flow of working oil formed when the front valve body is lifted.

Referring to FIG. 4, the check valve 10 comprises a ring-shaped leaf valve 11. The leaf valve 11 is fitted onto the outer circumference of the stopper 82 coaxially with the valve bodies 6 and 7 and is maintained in a closed state by a return spring 12 constituted by a dish spring. The stopper 82 comprises a flange part 82c which is fitted into the housing H. The working oil that flows out from the check valve 10 is led to the pressure chamber C1 though through-holes 82b formed through the flange part 82c. The leaf valve 11 faces the opening of the other end of each passage 5d, and opens without resistance when working oil flows out from the passages 5d into the pressure chamber C1 while blocking working oil from flowing into the passages 5d from the pressure chamber C1.

Referring again to FIG. 1, in the steering damper as constructed above, when the piston 2 slides in the cylinder barrel 1 in the right hand direction in the figure, the first oil chamber R1 contracts and the second oil chamber R2 expands. Accordingly, the pressure in the pressure chamber C1 which is connected to the first oil chamber R1 via the passage L1 rises.

Referring again to FIG. 4, the pressure in the pressure chamber C1 acts on the tip 6b of the front valve body 6 and causes the valve body 6 to retreat from the valve seat 8 against the biasing force of a solenoid actuator S, which is exerted on the front valve body 6 via the push rod S1 and the valve body 7. As a result, as shown by an arrow A in the figure, working oil flows out from the first oil chamber R1 to the second oil chamber R2 via the passage L1, the pressure chamber C1, the hollow part 82a, the hole portion 8a, the grooves 6c on the outer circumferential surface of the front valve body 6, the pressure chamber C2, and the passage L2. Herein, the flow cross-sectional area of the hole portion 8a is defined by the gap between the tip 6b of the front valve body 6 and the valve seat 8. The flow resistance of this gap generates a damping force to damp the displacement of the piston 2.

In FIG. 1, on the other hand, when the piston 2 slides in the cylinder barrel 1 in the left hand direction, the second oil chamber R2 contracts and the first oil chamber R1 expands. Accordingly, the pressure in the pressure chamber C2 which is connected to the second oil chamber R2 via the passage L2 rises.

Figure 5:
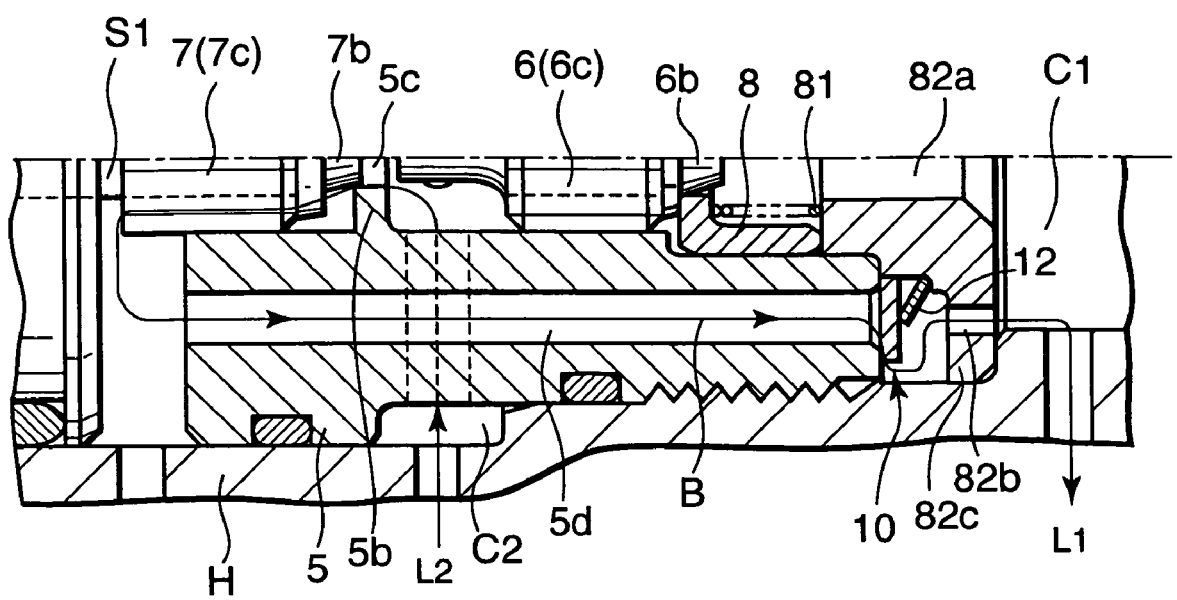
FIG. 5 is similar to FIG. 4, but shows a flow of working oil formed when the rear valve body is lifted.

Referring to FIG. 5, the pressure in the pressure chamber C2 acts on the tip 7b of the rear valve body 7 and causes the valve body 7 to retreat from the valve seat 5b against the biasing force of the solenoid actuator S, which is exerted on the rear valve body 7 via the push rod S1. As a result, as shown by an arrow B, working oil flows out from the second oil chamber R2 to the first oil chamber R1 via the passage L2, the pressure chamber C2, the hole portion 5c, the grooves 7c, the pressure chamber C3, the passages 5d, the check valve 10, the pressure chamber C1, and the passage L1. Herein, the flow cross-sectional area of the hole portion 5c is defined by the gap between the tip 7b of the rear valve body 7 and the valve seat 5b. The flow resistance of this gap generates a damping force to damp the displacement of the piston 2.

The lift timing of the front valve body 6 and the rear valve body 7 depends on the voltage setting of the energizing current supplied to the solenoid actuator S. The damping force generated in a state where the front valve body 6 or the rear valve body 7 is lifted depends on the voltage of the energizing current supplied to the solenoid actuator S and the conical shape of the conical tip 6a, 7a. Variation in the working oil amount due to temperature variation is compensated by the accumulator A connected to the pressure chamber C3.

As described above, in this steering damper, the passages 5d are disposed in parallel with the sliding direction of the valve bodies 6 and 7, and the check valve 10, which limits the flow direction in the passages 5d is constituted by the leaf valve 11 which is disposed coaxially with the valve bodies 6 and 7.

Owing to this arrangement, the steering damper according to this invention can make the housing H more compact than the housing of the prior art steering damper, in which the passage provided with the check valve is disposed perpendicular to the sliding direction of the valve bodies of the damping valve.

The contents of Tokugan 2007-64792, with a filing date of Mar. 14, 2007 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, in the embodiment described above, the cylinder D and the damping valve V are accommodated in a common housing H. It is also possible, however, to accommodate the cylinder D and the damping valve V in separate housings. When this invention is applied to such a steering damper, the size of the damping valve housing can still be reduced.

It is also possible to replace the linear type damper cylinder D by a rotary type damper cylinder which delimits the first oil chamber R1 and the second oil chamber R2 by means of a rotary vane in the housing H. If the rotary type damper cylinder is used, the vane is engaged with one of the vehicle body and the handlebars of a motorcycle while the housing is engaged with the other one of the vehicle body and the handlebars of the motorcycle.

Even when the linear type damper cylinder D is used, the damper cylinder D does not necessarily have to be a double rod type. The damper cylinder D may be constructed as a single rod type. When the cylinder D is constructed into a single rod type, the flow amount of working oil may be different depending on the sliding direction of the piston. In this case, the flow rate of the grooves 6c and 7c may be set differently, or the energizing current supplied to the solenoid actuator S may be varied depending on the sliding directions of the piston 2 in order to generate equal damping forces with respect to the two sliding directions of the piston 2.

It is also possible to bias the valve bodies 6 and 7 towards the closed positions using a spring instead of the solenoid actuator S.

It is possible to form only one passage 5b instead of forming a plurality of passages 5b through the valve case 5.

The embodiments of this invention in which an exclusive property or privilege is claimed are defined as follows:

What is claimed is:

1. A damping force generating mechanism which generates a damping force accompanying a flow of working oil between a first oil chamber and a second oil chamber, comprising:
   a front valve body which allows working oil to flow from the first oil chamber to the second oil chamber under a predetermined resistance when lifted in an axial direction;
   a rear valve body which is disposed on the rear side of the front valve body coaxially therewith and allows working oil to flow from the second oil chamber to the first oil chamber under a predetermined resistance when lifted in the axial direction;
   a first pressure chamber which exerts an oil pressure on the front valve body towards the rear valve body;
   a second pressure chamber which exerts an oil pressure on the rear valve body towards the front valve body;
   an oil passage disposed in parallel with a center axis of the front valve body and the rear valve body to connect the first and the second pressure chambers as a part of a flow path from the second oil chamber to the first oil chamber;
   a check valve which allows working oil to flow from the oil passage into the first oil chamber while preventing working oil from flowing in a reverse direction; and
   a valve case which encloses the front valve body and the rear valve body, wherein the oil passage is formed through the valve case.

2. The damping force generating mechanism as defined in claim 1, wherein the mechanism further comprises a solenoid actuator which biases the rear valve body towards a closed position, and the rear valve body is arranged to be in contact with the front valve body so as to transmit a biasing force of the solenoid actuator to bias the front valve body towards a closed position.

3. The damping force generating mechanism as defined in claim 2, further comprising a retractable valve seat supported resiliently in a lifting direction of the front valve body, the front valve body preventing working oil from flowing from the first oil chamber to the second oil chamber when seated on the retractable valve seat, and a fixed valve seat on which the rear valve body is seated, the rear valve body preventing working oil from flowing from the second oil chamber to the first oil chamber when seated on the fixed valve seat.

4. The damping force generating mechanism as defined in claim 3, further comprising a housing which encloses the valve case and a third pressure chamber connected to the second oil chamber, wherein the first pressure chamber is connected to the first oil chamber and formed on the front side of the front valve body in the housing, the second pressure chamber is connected to the oil passage and formed on the rear side of the rear valve body in the housing, and the third pressure chamber is formed on the front side of the rear valve body in the housing.

5. The damping force generating mechanism as defined in claim 4, wherein the front valve body comprises a groove on an outer circumferential surface thereof so as to cause working oil to flow from the first pressure chamber to the third pressure chamber when the front valve body is lifted, and the rear valve body comprises a groove on an outer circumferential surface thereof so as to cause working oil to flow from the third pressure chamber to the second pressure chamber when the rear valve body is lifted.

6. The damping force generating mechanism as defined in claim 4, wherein the first oil chamber and the second oil chamber are formed in the housing.

7. The damping force generating mechanism as defined in claim 2, wherein the front valve body comprises a conical tip which defines a flow cross-sectional area of working oil in relation to the retractable valve sheet when the front valve body is lifted, and the rear valve body comprises a conical tip which defines a flow cross-sectional area of working oil in relation to the fixed valve seat when the rear valve body is lifted.

8. The damping force generating mechanism as defined in claim 1, wherein the oil passage comprises a plurality of passages disposed around the front valve body and the rear valve body in parallel with the center axis of the front valve body and the rear valve body, and the check valve comprises a single leaf valve disposed coaxially with the front valve body and the rear valve body so as to close a plurality of openings of the passages.

9. The damping force generating mechanism as defined in claim 1, wherein the first oil chamber and the second oil chamber are formed in a cylinder barrel and delimited by a piston which is accommodated in the cylinder barrel so as to be free to displace, a pair of piston rods are fixed to either end face of the piston and project outwardly from the cylinder barrel in an axial direction, and the front valve body and the rear valve body are arranged respectively to lift in accordance with a displacing direction of the piston in the cylinder barrel.

* * * * *